United States Patent Office 3,325,913
Patented June 20, 1967

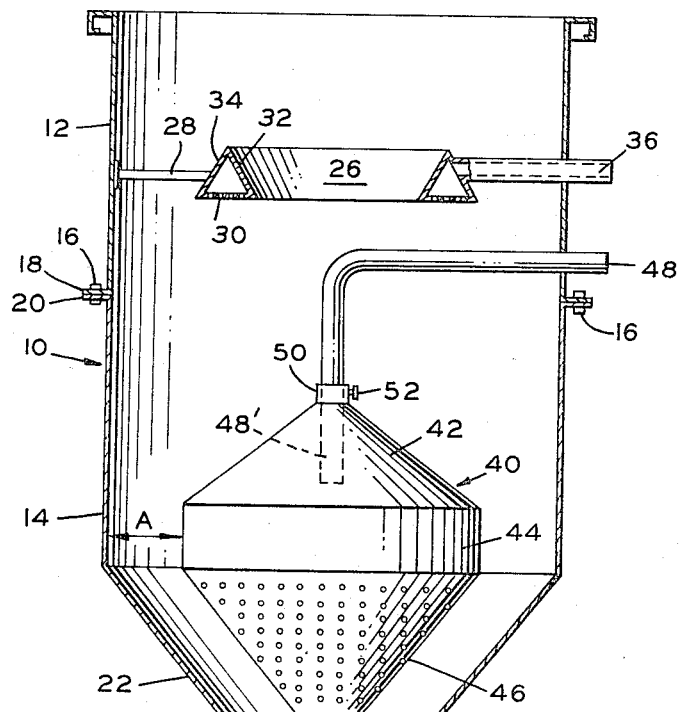
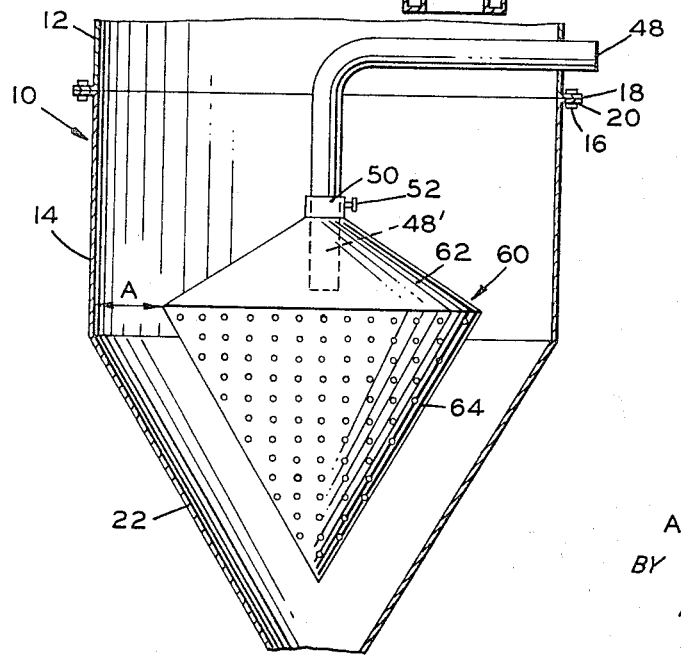

3,325,913
APPARATUS FOR TREATING PLASTIC
MATERIALS
Arthur E. Maus, Detroit, Mich., assignor to Thoreson-McCosh, Inc., Detroit, Mich., a corporation of Michigan
Filed Feb. 11, 1965, Ser. No. 431,866
5 Claims. (Cl. 34—174)

This invention relates to apparatus for handling particulate plastic material, and more particularly to apparatus for drying and preheating such material prior to its introduction into an extruder or injection machine or the like.

One of the foremost problems encountered in the treating of the plastic material is that of maintaining uniformly dried and preheated material delivery to the processing machine when it is operating at peak capacity over an extended period of time.

A general object of the invention therefore is the provision of a plastic material drying and heating apparatus having a continuous operating capacity sufficient to provide uniformly dried and heated plastic material for delivery to a processing machine.

Another object is to provide an apparatus of the character described which includes a plastic material hopper section mountable on an existing hopper located on the processing machine, with a heated air diffuser adjustably suspended within the hopper section to permit the diffuser to be vertically repositioned in the hopper at the optimum location therein for efficient drying and heating of the plastic material.

Another object is the provision of an improved plastic material heating and drying apparatus including a heated air diffuser having an imperforate upper conical portion for distributing the material on a perforated lower inverted conical portion through which heated air is directed, with the base diameters of such conical portions bearing a predetermined relationship to the diameter of the hopper or enclosure whereby uniform and thorough heating and drying of each particle of plastic material is assured.

Other objects, advantages and meritorious features will more fully appear from the following specification, claims and accompanying drawing, wherein:

FIG. 1 is a vertical section taken through apparatus embodying the invention showing the air diffuser and a material dispersing ring; and FIG. 2 is a partial vertical section similar to FIG. 1 showing a slightly modified diffuser.

Referring first to FIG. 1 there is shown a plastic material hopper 10 comprising upper and lower cylindrical sections shown at 12 and 14 respectively, such sections being secured together as by bolts or the like 16 extending through outwardly extending flanges 18 and 20 on the sections. The lower hopper section 14 has an inwardly tapering conical bottom wall 22 terminating in an outlet conduit 24, which is adapted to communicate with the inlet of the processing machine (not shown) to which the plastic material is to be fed. The upper hopper section 12 is congruent with the lower section and extends upwardly therefrom as shown.

Suspended in upper hopper section 12 is an annular plastic material dispersing member 26 supported in spaced relation from the hopper walls by brackets, one of which is shown in FIG. 1 at 28. Member 26 is triangular in vertical cross section, and preferably defines an isosceles triangle, having its base 30 disposed horizontally within the hopper. The legs 32 and 34 of the triangular member 26 are imperforate, while the base 30 is perforated for reasons which will be more fully apparent from the discussion hereinafter. Heated air is delivered from a suitable heater (not shown) which may be of any suitable character, through air inlet conduit 36 to the dispersing ring 26, from whence it flows through the perforations in the base 30 into hopper section 12.

Still with reference to FIG. 1, there is shown a diffuser 40 positioned in the hopper 10 in uniformly spaced relation from the cylindrical side walls of the hopper section 14. The diffuser 40 comprises an imperforate top 42 of conical shape, an imperforate cylindrical intermediate portion 44, and a perforated bottom 46 of inverted conical shape. A second heated air delivery conduit 48 extends through the side wall of the hopper 10 and communicates with the interior of the diffuser through the apex of the upper conical portion 42. The conduit 48 extends down into the diffuser 40 as shown in dotted lines at 48', while the diffuser 40 is provided with a collar member 50 having an adjustment screw 52 threadedly engaged therein and bearing against the conduit 48. As collar 50 is slidable along conduit 48, the diffuser may be selectively positioned on the conduit by the loosening of adjustment screw 52.

In order to provide thorough and efficient heating and drying of the particulate plastic material in the hopper 10, it has been found that a certain relationship must be maintained between the diffuser 40 and the hopper walls. Previous attempts to provide heating and drying apparatus for plastics have been only partially successful because of the failure to appreciate the importance of this relationship. Applicant has determined that the annular space between the diffuser 40 and the hopper walls must have a dimension of approximately one-sixth the diameter of the hopper section 14. Such dimension is indicated at A in FIG. 1. Stated another way, the diameter of the cylindrical portion 44 of diffuser 40 must be maintained at approximately two-thirds the diameter of the hopper section 14. It has also been found that most efficient operation is achieved with a diffuser as shown in FIG. 1 when the height of the cylindrical portion 44 of the diffuser 40 is substantially equal to one-sixth the diameter of the hopper, or in other words, when such height is substantially equal to the dimension marked A in FIG. 1. It is also important that the diffuser 40 be positioned with the lower edge of portion 44 positioned substantially radially opposite the intersection of cylindrical hopper section 14 and conical portion 22.

Referring now to FIG. 2, there is shown a slightly modified diffuser 60 having an upper conical portion 62 of imperforate material, and a lower inverted conical portion 64 which is perforated similarly to portion 46 of diffuser 40. The remaining reference numerals appearing in FIG. 2 are identical to those of FIG. 1 to indicate similar parts. The dimension indicated at A in FIG 2 is also the same, i.e. bears the same relationship to the hopper diameter, as its counterpart in FIG. 1. The conical sections 62 and 64 of diffuser 60 are interconnected at their bases, and the connection lies spaced slightly above the intersection of cylindrical hopper section 14 and conical portion 22 as shown.

The apparatus above disclosed is well adapted to handle any particulate plastic material in general use, which materials have a specific gravity in the range of about 1.0 to 1.3. Depending upon the particular material being treated, the face velocity of the heating and drying air within the hopper 10 above the diffuser 40 or 60 may vary within the general range of from about 30 feet per minute up to a maximum of about 200 feet per minute. With the relationships above set forth the face velocity of the air at the point indicated at A in the drawing will be equal to about twice the face velocity of the air in the hopper above the diffuser. If the annular space between the diffuser and hopper is appreciably greater than the optimum set forth, there is a tendency of the plastic material to "channel," i.e. flow through such space in streams of varying density rather than in a uniform mass. This of course results in some of the material being inadequately heated and dried, while other portions may be overheated. On the other hand, if this annular space is smaller than set forth, the plastic material will tend to remain suspended in the hopper, in which event the flow of material through the apparatus to the processing machine will be decreased.

What is claimed is:

1. Apparatus for treating particulate plastic material preparatory to deposit in a processing machine comprising: a plastic material hopper including an upper cylindrical portion having a material inlet at its top and an inverted conical lower end having a material discharge opening at its apex; an air diffuser member positioned axially within said hopper and suspended therein, said diffuser including an upper imperforate conical portion and a lower foraminous inverted conical portion, said diffuser portions being interconnected at their bases and each having a base diameter substantially equal to two-thirds the diameters of said upper hopper portion, with the diffuser bases positioned vertically within said cylindrical portion; and means coupled to said diffuser for introducing air therethrough to dry said plastic material as it flows through said hopper.

2. The invention as defined in claim 1 characterized in that said diffuser member includes an intermediate imperforate cylindrical portion interposed between the bases of said conical portions, the diameter of said cylindrical portion being equal to the diameters of the bases of said conical portions, and the height of the diffuser portion being substantially equal to one-fourth its diameter.

3. The invention as defined in claim 2 characterized in that said means for introducing air into said diffuser comprises an air conduit extending axially into the diffuser through said upper conical portion at the apex thereof and means releasably connecting the conduit to said upper conical portion to provide for adjustment of said diffuser member along the conduit.

4. The invention as defined in claim 1 characterized in that an annular dispersion ring is suspended within said hopper in spaced vertical relation above said diffuser, said ring being triangular in cross section with the base thereof being perforated and disposed substantially horizontally in the hopper and the legs thereof being imperforate and converging upwardly from the base.

5. Apparatus for treating particulate plastic material preparatory to deposit in a processing machine having a material intake port, comprising: a plastic material feeding hopper having an inverted conical lower portion communicating at its apex with said machine inlet port and a cylindrical upper portion provided with plastic material inlet means at the top thereof; a plastic material diffuser suspendably positioned coaxially within said hopper spaced from the walls thereof, said diffuser including an imperforate top portion of conical configuration and a foraminous bottom portion of inverted conical configuration with the bases of said top and bottom portions interconnected to provide a unitary structure, said diffuser bases having a diameter substantially equal to two-thirds the diameter of said upper cylindrical portion of the hopper; air supply conduit means extending into said diffuser at the apex of said top portion thereof; and means adjustably interconnecting said conduit means and said diffuser for selective positioning of the diffuser along the conduit.

References Cited

UNITED STATES PATENTS

| 2,548,295 | 4/1951 | Fahnestock | 34—170 X |
| 2,641,848 | 6/1953 | Wilson | 34—48 |
| 2,902,816 | 9/1959 | Rayner | 34—174 X |
| 2,916,831 | 12/1959 | McCosh | 34—57 |
| 3,107,160 | 10/1963 | McClaren | 34—174 |

KENNETH W. SPRAGUE, *Primary Examiner.*